United States Patent
Pung et al.

(10) Patent No.: US 9,023,905 B2
(45) Date of Patent: May 5, 2015

(54) CLEANING IMPLEMENT BASED ON MELAMINE FORMALDEHYDE FOAM COMPRISING ABRASIVE PARTICLES

(75) Inventors: David John Pung, Loveland, OH (US); Denis Alfred Gonzales, Brussels (BE); Tobias Heinz Steinke, Speyer (DE); Peter Nessel, Ludwigshafen (DE)

(73) Assignee: The procter & Gamble Company, Cincinnati, OH (US)

( * ) Notice: Subject to any disclaimer, the term of this patent is extended or adjusted under 35 U.S.C. 154(b) by 131 days.

(21) Appl. No.: 13/404,044

(22) Filed: Feb. 24, 2012

(65) Prior Publication Data

US 2012/0216832 A1 Aug. 30, 2012

Related U.S. Application Data

(60) Provisional application No. 61/446,066, filed on Feb. 24, 2011.

(51) Int. Cl.
| | | |
|---|---|---|
| *B08B 1/00* | (2006.01) | |
| *A47L 13/16* | (2006.01) | |
| *C08J 9/00* | (2006.01) | |
| *C08J 9/14* | (2006.01) | |

(52) U.S. Cl.
CPC ............... *A47L 13/16* (2013.01); *C08J 9/0061* (2013.01); *C08J 9/0066* (2013.01); *C08J 9/141* (2013.01); *C08J 2361/28* (2013.01); *C08J 2433/06* (2013.01); *C08J 2461/28* (2013.01); *C08J 2463/00* (2013.01); *C08J 2469/00* (2013.01); *C08J 2475/00* (2013.01); *C08J 2477/00* (2013.01)

(58) Field of Classification Search
CPC ........ C08J 9/0061; C08J 9/0066; C08J 9/141; C08J 2361/28; C08J 2433/06; C08J 2461/28; C08J 2463/00; C08J 2469/00; C08J 2475/00; C08J 2477/00
USPC ......... 521/100, 122, 123, 187, 188, 128–132; 524/6, 493
See application file for complete search history.

(56) References Cited

U.S. PATENT DOCUMENTS

| | | | |
|---|---|---|---|
| 4,569,861 A | 2/1986 | Smith et al. | |
| 6,608,118 B2 | 8/2003 | Kosaka et al. | |
| 7,040,973 B1 * | 5/2006 | Kitts | 451/533 |
| 8,546,457 B2 | 10/2013 | Alteheld et al. | |
| 2007/0061991 A1 | 3/2007 | Gonzales et al. | |
| 2007/0213417 A1 | 9/2007 | Stork et al. | |
| 2011/0124754 A1 * | 5/2011 | Alteheld et al. | 521/122 |

FOREIGN PATENT DOCUMENTS

| | | | |
|---|---|---|---|
| DE | 23562969 | * | 4/1975 |
| DE | 3914259 | * | 10/1990 |
| EP | 111 860 B1 | | 4/1989 |
| EP | 451 535 B1 | | 6/1995 |
| GB | 1188381 | * | 4/1970 |
| JP | 2003175466 A | * | 6/2003 |
| NL | 1024682 | * | 5/2005 |
| WO | WO 02/31032 A1 | | 4/2002 |

* cited by examiner

*Primary Examiner* — Irina S Zemel
(74) *Attorney, Agent, or Firm* — Larry L. Huston; Steven W. Miller

(57) ABSTRACT

The present invention relates to a cleaning implement based on melamine formaldehyde foams comprising, abrasive particles and to a method of cleaning a hard surface with said cleaning implement.

11 Claims, 1 Drawing Sheet

CLEANING IMPLEMENT BASED ON MELAMINE FORMALDEHYDE FOAM COMPRISING ABRASIVE PARTICLES

CROSS REFERENCE TO RELATED APPLICATION

This application claims the benefit of U.S. Provisional Application No. 61/446,066 filed Feb. 24, 2011.

TECHNICAL FIELD

The present invention relates to a cleaning implement based on melamine formaldehyde foams comprising abrasive particles.

BACKGROUND OF THE INVENTION

Open-cell foams and particular melamine-formaldehyde resin foams (also referred to herein as melamine foams) are well known in the art for use in industrial applications, for example, as heat of sound insulating materials as well as for fire protection purposes.

Recently, a novel application for such open-cell foams in the area of hard surface cleaning has been discovered. Indeed, cleaning implements of cut or molded pieces of such open-cell foam, and in particular melamine foam, have become popular to remove soils and/or stains from hard surfaces (i.e., cleaning of hard surfaces) such as tiles, walls, floors, sanitary fittings such as sinks, showers, shower curtains, wash basins, WCs, household appliances including, but not limited to, refrigerators, freezers, washing machines, automatic dryers, ovens, microwave ovens, dishwashers and so on. Indeed, melamine foam sponges are currently marketed under the tradename Mr. Clean Magic Eraser®.

It is has been observed that open-cell foam (and melamine foam in particular) shows good soil and/or stain removal performance when used to clean hard surfaces, on stains/soils such as marks on walls and furniture. Indeed, it has been observed that open-cell foams (and melamine foam in particular) when wetted with an appropriate solvent, such as tap water, removes soils and/or stains from a hard surface when said hard surface is brought into contacted with said wetted modified open-cell foam. By "bringing into contact" it is meant wiping, swiping, rubbing or the like. In order for the open-cell foam (and melamine foam in particular) to optimally remove soils and/or stains from hard surfaces substantial amounts of an appropriate solvent, such as tap water, have to be used. Most commonly, tap water is used by the users of melamine foam when removing soils and/or stains from hard surfaces. When used with water or any other appropriate solvent, the open-cell foam (and melamine foam in particular) comes off as small particles (meaning, the foam crumbles) when brought into contact with a hard surface. Indeed, a milky suspension of small modified open-cell foam (and melamine foam in particular) particles in water is formed. However there has been the need for better soil and/or stain removal with better durability upon use.

It is therefore, an objective of the present invention to provide a cleaning implement, wherein said implement is capable of (improved) cleaning greasy soap scum soils and neat kitchen dirt (grease) from hard surfaces whilst providing a good surface safety profile and at the same time showing excellent durability upon use.

It has been now found that above objective can be met by use of cleaning implement based on melamine formaldehyde foams comprising from 0.01% to 45% by weight of a abrasive particles having an average particle diameter in the range from 5 μm to 3 mm, wherein the % by weight are based on the total weight of abrasive particles plus melamine-formaldehyde precondensate used for foam production. Indeed, the objectives are met by cleaning implement according to present invention comprising such melamine formaldehyde foam, the method of cleaning hard surfaces with such a cleaning implement or the method of cleaning hard surfaces with the melamine formaldehyde foams according to present invention.

SUMMARY OF THE INVENTION

Present invention relates to a cleaning implement (1) comprising a melamine-formaldehyde foam (2) comprising from 0.01% to 45% by weight of a abrasive particles (5) having an average particle diameter in the range from 5 μm to 3 mm, wherein the % by weight are based on the total weight of abrasive particles plus melamine-formaldehyde precondensate used for foam production.

The present invention further encompasses a method for cleaning a hard surface with a cleaning implement according to the present invention.

DESCRIPTION OF THE REFERENCE NUMERALS

Figure 1:
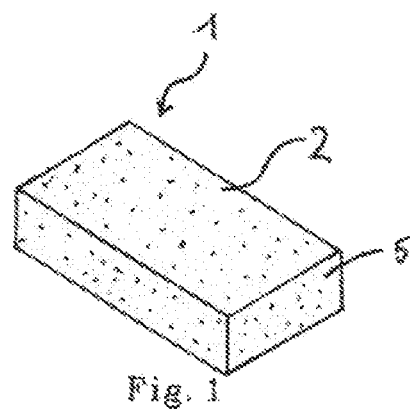
FIG. 1 is a perspective view of a cleaning implement (1).

1: Cleaning implement
2: Melamine formaldehyde foam layer comprising particulate material
3: Layer of second foam.
4: Line indicating the separation of the two layers
5: Abrasive particles

DETAILED DESCRIPTION OF THE INVENTION

Cleaning Implement

The cleaning implement (1) herein comprises melaminformaldehyde foam comprising abrasive particles (5).

By a "cleaning implement" it is meant herein an article of manufacture of any suitable shape and/or size and/or volume suitable for cleaning, i.e., removing spots and/or stains from hard surfaces. In a highly preferred embodiment according to the present invention, the cleaning implement herein is in a shape and/or size and/or volume suitable for use by a consumer to clean hard surfaces therewith. Examples of cleaning implements are wipers, brushes, cleaning cloths or cleaning granules.

In a preferred embodiment, the cleaning implements herein are suitable for cleaning/cleansing inanimate surfaces selected from the group consisting of household hard surfaces; dish surfaces; surfaces like leather or synthetic leather; and automotive vehicles surfaces.

In a highly preferred embodiment, the cleaning implements herein are suitable to clean household hard surfaces.

By "household hard surface", it is meant herein any kind of surface typically found in and around houses like kitchens, bathrooms, e.g., floors, walls, tiles, windows, cupboards, sinks, showers, shower plastified curtains, wash basins, WCs, fixtures and fittings and the like made of different materials like ceramic, vinyl, no-wax vinyl, linoleum, melamine, glass, Inox®, Formica®, any plastics, plastified wood, metal or any painted or varnished or sealed surface and the like. Household hard surfaces also include household appliances including, but not limited to refrigerators, freezers, washing machines, automatic dryers, ovens, microwave ovens, dishwashers and so on. Such hard surfaces may be found both in private households as well as in commercial, institutional and industrial environments.

Suitable shapes of the cleaning implements (1), such as a wiper, herein may be selected from the group consisting of: cube shape, rectangular shape, pyramid shape, cylindrical shape, cone shape, pencil eraser shape, cuboid shape, tetrahedron shape; sphere shape; globular shape; and ellipsoid shape. Preferably, said cleaning implement has a shape selected from the group consisting of: cube shape, rectangular shape, pencil eraser shape, and cuboid shape.

Suitable volumes of the cleaning implements herein may be from 1 $cm^3$ to 10,000 $cm^3$, preferably from 10 $cm^3$ to 1,000 $cm^3$, more preferably from 150 $cm^3$ to 250 $cm^3$.

In a highly preferred embodiment herein, the cleaning implement (1) herein has a cuboid shape defined by three groups of parallel and equal length sides, referred to as a, b and c, wherein a ranges from 2 cm to 20 cm, preferably 4 cm to 8 cm, b ranges from 2 cm to 20 cm preferably 8 cm to 15 cm, and c ranges from 1.5 cm to 5 cm, preferably 2 cm to 4 cm.

In a preferred embodiment according to present invention, the thickness of said melamine formaldehyde foam comprising abrasive particles foam (2) layer is from 5 mm to 100 mm, preferably from 7 mm to 50 mm, more preferably 10 mm to 50 mm even more preferably from 15 mm to 50 mm, still more preferably from 20 mm to 40 mm.

The cleaning implement (1) of a first embodiment of the present invention as shown in FIG. 1 comprises a single layer (2) of melamin formaldehyde foam comprising abrasive particles (5).

In a preferred embodiment according to the present invention the cleaning implements herein may comprise additional layers of material. Preferably, in the cleaning implement herein said melamine formaldehyde foam (2) comprising abrasive particles (5) forms a first layer and said cleaning implement additionally comprises a second layer of material. Even more preferably, said second layer of material is a second foam layer (3) made of a second foam material as discussed herein below. Such a cleaning implement according to this preferred embodiment is shown in FIG. 2.

The layers of melamine formaldehyde foam (2) comprising abrasive particles (5) and second foam (3) may be arranged in said cleaning implement in any way suitable. In a preferred embodiment according to present invention the layers of melamine formaldehyde foam (2) comprising abrasive particles (5) and second foam (3) are arranged parallel to at least one side, preferably two opposite sides, of the cleaning implement. However, the cleaning implement may also have an irregular shape. Indeed, the thickness of the layers may be constant or vary throughout the cleaning implement. The separation line (4) between the two layers may form a straight line or may form a bend or be completely irregular. In addition, the separation plane of the layers may be in the center of cleaning implement, dividing the implement in two equal parts, or may be in the upper or lower part of the implement. In addition; the cleaning implement may be in the shape of a sphere or a globule or an ellipsoid with the separation plane of the layers forming a spherical segment or one of the layers, preferably the layer of a second foam here, forming a sphere in a sphere (similar to the layers of an onion).

Figure 2:
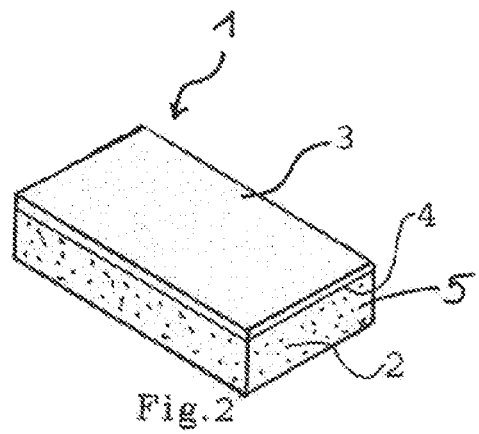
FIG. 2 is a perspective view of a cleaning implement (1) comprising two layers.

In this highly preferred embodiment of the present invention, wherein the cleaning implement (1) herein has a cuboid shape, the line indicating the separation (4) of the two layers (or the surface areas where the two layers are joined together) of the implement is preferably substantially parallel (preferably parallel) to the side of the cuboid shaped implement having the largest surface area (as shown in FIG. 2).

In another highly preferred embodiment herein the cleaning implement herein is in the shape of a pencil eraser. By "shape of a pencil eraser" it is meant herein a voluminous body having six walls, wherein three pairs of parallel and equally shaped and sized walls exist and wherein one pair of walls are in the shape of a parallelogram and the remaining two pairs of walls are of rectangular shape. In this preferred embodiment, wherein the cleaning implement herein has the shape of a pencil eraser, the line indicating the separation of the two layers (or the surface areas where the two layers are joined together) of the implement is preferably substantially parallel (preferably parallel) to the side of implement in the shape of a pencil eraser having the largest surface area.

In order to obtain suitable cleaning implements according to a preferred embodiment of the present invention, the melamine formaldehyde foam layer (2) comprising abrasive particles (5) and the second layer of a second foam (3) have to be attached to each other. This attachment can be achieved by any attachment means suitable for joining the two layers. The attachment may be either a permanent attachment (wherein the two layers cannot be separated without inflicting substantial damage to the layers) or temporary attachment (wherein the two layers may be separated without inflicting substantial damage to the layers). Suitable attachment means providing a permanent attachment are selected from the group consisting of: foam flame laminating the two layers together; use of a permanent adhesive; sewing the two layers together; and needle-punching the two layers together; and combinations thereof. Suitable attachment means providing a temporary attachment are selected from the group consisting of: a weak adhesive; Velcro; and a water-based, water-soluble coating or adhesive; and combinations thereof.

In a preferred embodiment here, the attachment of layers herein is a permanent attachment.

Foam flame lamination is a continuous process that can adhere foams and additional materials, if any, to one or both sides of foam in a single pass. The process of flame lamination involves the passing of first foam (either the melamine formaldehyde foam comprising abrasive particles herein or the second foam herein) over an open flame, which creates a thin layer of molten foam/polymer. Second foam (either the second foam herein or the melamine formaldehyde foam comprising abrasive particles herein, depending on the first step) is pressed against the first foam while it is still in the molten state. Foams and additional material, if any, can be adhered to one or both sides of the foam in a single pass. Furthermore, additional passes are optional. The strength of the bond depends upon the foams and additional material, if any, selected and the processing conditions (i.e., gas type, flame height and spread, foam burn-off and nip pressure).

The cleaning implement according to the present invention may contain more than two layers, wherein said additional layers, if any, may be of the same or similar materials as the melamine formaldehyde foam comprising abrasive particles or said second foam, or may be made of another material having similar properties as said second foam or different properties therefore. Indeed, the cleaning implement herein may be in a so-called sandwich configuration, wherein three layers are present. In a preferred embodiment, wherein the cleaning implement herein is in a sandwich configuration, the middle layer may be said second foam and at least one of the two outer layers is melamine formaldehyde foam comprising abrasive particles with the second outer layer being either melamine formaldehyde foam comprising abrasive particles or another material providing other feature, such as abrasiveness or increased rigidity. In a highly preferred embodiment according to the present invention the cleaning implement herein comprises two outer layers of said melamine formaldehyde foam comprising abrasive particles and an inner layer, preferably of a second foam material, as discussed herein below.

The layers of the cleaning implement according to the present invention may cover each other either partially or fully. By a "partial coverage" it is meant that at least one of the layers overlaps the other layer (or other layers, if any) and is not fully covered by said other layer (or other layers, if any). By a "full coverage" it is meant that the layers of the cleaning implement do fully cover each other and that none of the layers substantially overlap the other layer (or other layers, if any).

The ratio of said melamine formaldehyde foam comprising abrasive particles to said second foam in the cleaning implement according to the present invention is preferably from 20:1 to 1:20 by volume, more preferable from 10:1 to 1:10 by volume, even more preferably 5:1 to 1:1, still more preferably 5:1 to 2:1, and most preferably from 4:1 to 3:1 by volume.

In order to obtain suitable cleaning implements according to the present invention, the melamine formaldehyde foam comprising abrasive particles—and second foam-raw materials may have to be modified in shape and/or size. This modification can be done by any means known to those skilled in the art. Suitable means of modifying the shape and/or size of melamine foam- and second foam-raw materials may be selected from the group consisting of: cutting, breaking, and tearing, and combinations thereof.

Melamine Formaldehyde Foam Comprising Abrasive Particles

The melamine formaldehyde foams according to the present invention comprise from 0.01% to 45% by weight, preferably from 1% to 30% and more preferably from 5% to 20% by weight of one or more, i.e., 1 to 10, preferably 1 to 5, more preferably 1 to 3, even more preferably 1 or 2 and most preferably 1 abrasive particles, wherein the % by weight are all based on the total weight of abrasive particles and melamine-formaldehyde precondensate used for foam production.

According to the present invention, the abrasive particles have an average particle diameter in the range from 5 μm to 3 mm, preferably in the range from 10 to 1000 μm and more preferably in the range from 100 to 600 μm ($d_{50}$ value, number averaged, determined via optical or electron microscopy combined with image analysis). The particle size distribution of the abrasive particles can be mono-, bi- or multimodal.

The individual abrasive particles can themselves be constructed of smaller agglomerated particles, often referred to as primary particles. For example, abrasive particles can be used in the form of agglomerate particles having the above-described particle diameters, in which case each agglomerate consists of smaller primary particles. Such particles in agglomerate form are known in principle to a person skilled in the art and are described in the literature; they are obtainable for example by adding agglomerization auxiliaries to abrasive particles and subsequent mixing.

The abrasive particles are preferable color stable particles. By "color stable" it is meant herein that color of the particles used in the present invention will not turn yellow during storage and use.

The particles used in the present invention are preferably white and/or transparent. The color of particles can be changed by using suitable dyes and/or pigments. Additionally suitable color stabilizing agents can be used to stabilize desired color.

In a preferred embodiment the abrasive cleaning particles are preferably non-rolling. Alternatively in another preferred embodiment the abrasive cleaning particles are preferably sharp.

Indeed the applicant has found that non-rolling and/or sharp abrasive cleaning particles provide good soil removal.

The abrasive cleaning particles herein are preferably non-spherical.

The non-spherical particles herein preferably have sharp edges and each particle has at least one edge or surface having concave curvature. More preferably, the non-spherical particles herein have a multitude of sharp edges and each particle has at least one edge or surface having concave curvature. The sharp edges of the non-spherical particles are defined by edge having a tip radius below 20 μm, preferably below 8 most preferably below 5 μm. The tip radius is defined by the diameter of an imaginary circle fitting the curvature of the edge extremity.

According to the present invention, the abrasive particles are present in particle form, preferably the ratio of the longest axis to the shortest axis of the particles is in the range from 4:1 to 1:1, although spherical abrasive particles can also be used.

In one preferred example, the abrasive particles used in the present invention remain visible when in melamine formaldehyde foam, while during the effective cleaning process abrasive particles disperse or break into smaller particles and become invisible to an eye.

Useful abrasive particles include in principle any substance, while preference is given to inorganic substances or organic polymers known to a person skilled in the art and described in the literature. The abrasive particles used herein need to show excellent performance in removing greasy soap and neat kitchen dirt from said hard surfaces, whilst providing adequate surface safety.

Useful inorganic abrasive, particles are preferably quartz, olivine, basalt, glass spheres, ceramic spheres, clay minerals such as for example kaolin, ammonium phosphate and phosphoric acid, sulfates such as ammonium sulfate, barium sulfate and calcium sulfate, carbonates such as calcium carbonate, and dolomite $CaMg(CO_3)_2$, kieselguhr, hydroxides such as aluminum, calcium hydroxide and magnesium hydroxide, zinc borates, antimony trioxide and antimony pentoxide, silicates, such as aluminum silicate and calcium silicate, such as wollastonite $CaSiO_3$, silimanite $Al_2SiO_5$, nepheline $(Na,K)AlSiO_4$, andalusite $Al_2[O|SiO_4]$, feldspar $(Ba,Ca,Na,K,NH_4)(Al,B,Si)_2O_8$, sheet-silicates, such as montmorillonite (smectite) $(Al,Mg,Fe)_2[(OH)_2|(Si,Al)_4O_{10}]$ $Na_{0.33}(H_2O)_4$, vermiculite $Mg_2(Al,Fe,Mg)[(OH)_2|(Si,Al)_4O_{10}] \cdot Mg_{0.35}(H_2O)_4$, allophane $Al_2[SiO_5]_6O_3 \cdot nH_2O$, kaolinite $Al_4[(OH)_8|Si_4O_{10}]$, halloysite $Al_4[(OH)_8|Si_4O_{10}] \cdot 2H_2O$, mullite $Al_8[(O,OH,F)|(Si,Al)O_4]_4$, talcum $Mg_3Si_4O_{10}(OH)_2$, hydrous sulfates $Ca[SO_4] \cdot 2H_2O$, mica, for example muskovite, colloidal silica or mixtures thereof, preferably granular minerals, such as sands and glass spheres.

Useful organic polymers are preferably polyurethane, melamine-formaldehyde resin, epoxy resin, polyester, polycarbonate, polyacrylates, polyamides or mixtures thereof.

The abrasive particles can be coated or uncoated. The amount of the coating material can be varied within wide limits and is generally in the range from 1% to 20% by weight, preferably in the range from 1 to 10% by weight and more preferably in the range from 1% to 5% by weight based on the abrasive particles, advantageously the amount, of coating material used is the minimum sufficient to ensure coating.

Useful coating materials include polymeric entities for example melamine-formaldehyde resins. Suitable polyurethane resins, polyester resins or epoxy resins for coating are known to a person skilled in the art. Such resins may be found for example in Encyclopedia of Polymer Science and Technology (Wiley) under the following chapter headings: a) Polyesters, unsaturated: Edition 3, Vol. 11, 2004, pp. 41-64; b) polyurethanes: Edition 3, Vol. 4. 2003, pp. 26-72 and c) Epoxy resins: Edition 3, Vol. 9, 2004, pp. 678-804. Furthermore, Ullmann's Encyclopedia of Industrial Chemistry (Wiley) contains the following chapters: a) Polyester resins, unsaturated Edition 6, Vol. 28, 2003, pp. 65-74; b) Polyurethanes: Edition 6, Vol. 28, 2003, pp. 667-722 and c) Epoxy resins: Edition 6, Vol. 12, 2003, pp. 285-303. Furthermore, amino- or hydroxy-functionalized polymers, more particularly a polyvinyl amine, or polyvinyl alcohol can be used. It is similarly possible to use inorganic coating materials based on phosphate, silicate and borate groups or combinations thereof.

The abrasive particles may also display chemical functionalization at their surface to improve attachment, to the foam structure. The chemical functionalization of the surfaces of abrasive particles is known in principle to a person skilled in the art and is described in WO2605/103107 for example.

The melamine-formaldehyde foams of the present invention comprise an open-cell scaffolding of foamed material, the scaffolding comprising a multiplicity of interconnected, three-dimensionally branched struts, and in each of which the particulate fillers are embedded into the pore structure. The particle size preferably corresponds to the average pore diameter of the foam structure, this average pore diameter being preferably in the range from 10 to 1000 μm and more particularly in the range from 50 to 600 μm ($d_{50}$ value, number averaged, determined via optical or electronic microscopy combined with image analysis). The abrasive particles can thus be ideally bound into the pore structure of the open-cell foam and immobilized from all sides of the pore scaffolding. Such a structure cannot be produced by subsequent impregnation of the foamed material with abrasive particles, since for this the particle size of the abrasive particles always has to be chosen such that the particle size is smaller than the pore size of the foamed material in order that distribution in the entire foamed material may be ensured.

The melamine-formaldehyde precondensates used for producing the melamine-formaldehyde foams of the present invention generally have a molar ratio of formaldehyde to melamine in the range from 5:1 to 1.3:1 and preferably in the range from 3.5:1 to 1.5:1.

These melamine-formaldehyde condensation products, in addition to melamine, may comprise from 0% to 50% by weight, preferably from 0% to 40% by weight, more preferably from 0% to 30% by weight and more particularly from 0% to 20% by weight of other thermoset-formers and, in addition to formaldehyde, from 0% to 50% by weight, preferably from 0% to 40% by weight, more preferably from 0% to 30% by weight and more particularly from 0% to 20% by weight of other aldehydes, in condensed form. Preference is given to unmodified melamine-formaldehyde precondensates.

Useful thermoset-formers include for example alkyl- and aryl-substituted melamine, urea, urethanes, carboxamides, dicyandiamide, guanidine, sulfurylamide, sulfonamides, aliphatic amines, glycols, phenol or their derivatives.

Useful aldehydes include for example acetaldehyde, trimethylolacetaldehyde, acrolein, benzaldehyde, furfural, glyoxal, glutaraldehyde, phthalaldehyde, terephthalaldehyde or their mixtures. Further details concerning melamine-formaldehyde condensation products are found in Houben-Weyl, Methoden der organischen Chemie, volume 14/2, 1963, pages 319 to 402.

The melamine-formaldehyde foams of the present invention are obtainable as follows:

The abrasive particles can be added to the feedstock used for foam production, i.e., the melamine, the formaldehyde, their mixtures or a melamine-formaldehyde precondensate, during the foaming operation, but are preferably added before the foaming operation.

A melamine-formaldehyde precondensate and a solvent can preferably be foamed with an acid, a dispersant, a blowing agent and inorganic abrasive particles at temperatures above the boiling temperature of the blowing agent and subsequently dried.

In one particular embodiment, the abrasive particles are coated by methods known to a person skilled in the art before being added to the foaming operation. This can be accomplished for example by means of a spraying apparatus in a mixing apparatus (for example an intensive mixer from Eirich). Homogeneous wetting of the abrasive particles is achieved in this way. In one particular embodiment, the coating material is not allowed to fully harden in order that attachment in the foam may be increased.

As melamine-formaldehyde precondensates there may be used specially prepared precondensates of the two components, melamine and formaldehyde (see reviews: a) W. Woebcken, Kunststoffhandbuch 10. Duroplaste, Munich, Vienna 1988, b) Encyclopedia of Polymer Science and Technology, $3^{rd}$ edition, Vol. 1, Amino Resins, pages 340 to 370, 2003 c) Ullmann's Encyclopedia of Industrial Chemistry, $6^{th}$ edition, Vol. 2, Amino Resins, pages 537 to 565. Weinheim 2003) or commercially available precondensates of the two components, melamine and formaldehyde. The melamine-formaldehyde precondensates generally have a molar ratio of formaldehyde to melamine in the range from 5:1 to 1.3:1 and preferably in the range from 3.5:1 to 1.5:1.

A preferred version of the process for producing the foam of the present invention comprises the stages of
(1) producing a suspension comprising a melamine-formaldehyde precondensate of the foam to be produced, abrasive particles and optionally further added components,
(2) foaming the precondensate by heating the suspension from step (1) to a temperature above the boiling temperature of the blowing agent,
(3) drying the foam obtained from step (2).

The individual process steps and the various possible versions will now be more particularly discussed.

The melamine-formaldehyde precondensate may be prepared in the presence of alcohols, for example methanol, ethanol or butanol in order that partially or fully etherified condensates may be obtained. Forming the ether groups is a way of influencing the solubility of the melamine-formaldehyde precondensate and the mechanical properties of the fully cured material.

Anionic, cationic and nonionic surfactants and also mixtures thereof can be used as dispersant/emulsifier.

Useful anionic surfactants include for example diphenylene oxide sulfonates, alkane- and alkylbenzenesulfonates, alkylnaphthalenesulfonates, olefinsulfonates, alkyl ether sulfonates, fatty alcohol sulfates, ether sulfates, α-sulfo fatty acid esters, acylaminoalkanesulfonates, acyl isethionates, alkyl ether carboxylates, N-acylsarcosinates, alkyl and alkylether phosphates. Useful nonionic surfactants include alkylphenol polyglycol ethers, fatty alcohol polyglycol ethers, fatty acid polyglycol ethers, fatty acid alkanolamides, ethylene oxide-propylene oxide block copolymers, amine oxides, glycerol fatty acid esters, sorbitan esters and alkylpolyglycosides. Useful cationic emulsifiers include for example alkyltriammonium salts, alkyl benzyldimethylammonium salts and alkylpyridinium salts.

The dispersants/emulsifiers can be added in amounts from 0.2% to 5% by weight, based on the melamine-formaldehyde precondensate.

The dispersants/emulsifiers and/or protective colloids can in principle be added to the crude dispersion at any time, but they can also already be present in the solvent at the time the microcapsule dispersion is introduced.

In principle, the process of the present invention can use both physical and chemical blowing agents.

Depending on the choice of melamine-formaldehyde precondensate, the mixture comprises a blowing agent. The amount of blowing agent in the mixture generally depends on the desired density for the foam.

"Physical" or "chemical" blowing agents are suitable (Encyclopedia of Polymer Science and Technology, Vol. I, 3$^{rd}$ ed., Additives, pages 203 to 218, 2003).

Useful "physical" blowing agents include for example hydrocarbons, such as pentane, hexane, halogenated, more particularly chlorinated and/or fluorinated, hydrocarbons, for example methylene chloride, chloroform, trichloroethane, chlorofluorocarbons, hydrochlorofluorocarbons (HCFCs), alcohols, for example methanol, ethanol, n-propanol or isopropanol, ethers, ketones and esters, for example methyl formate, ethyl formate, methyl acetate or ethyl acetate, in liquid form or air, nitrogen or carbon dioxide as gases.

Useful "chemical" blowing agents include for example isocyanates mixed with water, releasing carbon dioxide as active blowing agent. It is further possible to use carbonates and bicarbonates mixed with acids, in which case carbon dioxide is again produced. Also suitable are azo compounds, for example azodicarbonamide.

In a preferred embodiment of the invention, the mixture further comprises at least one blowing agent. This blowing agent is present in the mixture in an amount of 0.5% to 60% by weight, preferably 1% to 40% by weight and more preferably 1.5% to 30% by weight, based on the melamine-formaldehyde precondensate. It is preferable to add a physical blowing agent having a boiling point between 0 and 80° C.

As curatives it is possible to use acidic compounds which catalyze the further condensation of the melamine formaldehyde foam. The amount of these curatives is generally in the range from 0.01% to 20% by weight and preferably in the range from 0.05% to 5% by weight, all based on the precondensate. Useful acidic compounds include organic and inorganic acids, for example selected from the group consisting of hydrochloric acid, sulfuric acid, phosphoric acid, nitric acid, formic acid, acetic acid, oxalic acid, toluenesulfonic acids, amidosulfonic acids, acid anhydrides and mixtures thereof.

In a further embodiment, in addition to the melamine-formaldehyde precondensate of the foam to be produced and the abrasive particles, the mixture also comprises an emulsifier and also optionally a curative and optionally a blowing agent.

In a further embodiment, the mixture is free of further added substances. However, for some purposes it can be advantageous to add from 0.1% to 20% by weight, preferably from 0.1% to 10% by weight, based on the melamine-formaldehyde precondensate, of customary added substances other than the abrasive particles, such as fibers, dyes, flame retardants, UV stabilizers, agents for reducing the toxicity of fire gases or for promoting carbonization, scents, optical brighteners or pigments. These added substances preferably form a homogeneous distribution in the foamed material.

Useful pigments include for example the common organic pigments. These pigments can be mixed with the abrasive particles beforehand.

The next step of the process of the present invention comprises the precondensate being foamed up generally by heating the suspension of the melamine-formaldehyde precondensate and of the abrasive particles to obtain a foamed material comprising the abrasive particles. To this end, the suspension is generally heated to a temperature above the boiling point of the blowing agent used and foamed in a closed mold.

The introduction of energy may preferably be effected via electromagnetic radiation, for example via high-frequency radiation at 5 to 400 kW, preferably 5 to 200 kW and more preferably 9 to 120 kW per kilogram of the mixture used in a frequency range from 0.2 to 100 GHz, preferably 0.5 to 10 GHz. Magnetrons are a useful source of dielectric radiation, and one magnetron can be used or two or more magnetrons at the same time.

The foamed materials produced are finally dried, removing residual water and blowing agent from the foam.

An after treatment can also be utilized to hydrophobicize the foam. This after treatment preferably employs hydrophobic coating agents having high thermal stability and low flammability, for example silicones, siliconates or fluorinated compounds.

The process described provides blocks/slabs of foamed material, which can be cut to size in any desired shapes.

The foam blocks or slabs can optionally be thermo compressed in a further process step. Thermo compression as such is known to a person skilled in the art and described for example in WO 2007/031944, EP-A 451 535, EP-A 111 860 and U.S. Pat. No. 6,608,118. Thermo compression often provides better fixing of the abrasive particles to the open-cell structure of foam.

The density of the foam is generally in the range from 5 to 100 kg/m$^3$, preferably in the range from 10 to 100 kg/m$^3$, more preferably in the range from 15 to 85 kg/m$^3$ and more preferably in the range from 40 to 75 kg/m$^3$.

The foam obtainable by the process of the present invention preferably has an open-cell structure having open-cell content, when measured to DIN ISO 4590, of more than 50% and more particularly more than 80%.

The average pore diameter is preferably in the range from 10 to 1000 μm and more particularly in the range from 50 to 600 μm.

The foam of the present invention is preferably elastic.

The melamine-formaldehyde foams of the present invention, comprising from 0.01% to 45% by weight of abrasive particles, can be used to keep certain effects without an undesired high deterioration in the mechanical properties being observed compared with the unfilled foams.

EXAMPLES

Comparative Example V-A

Preparation of melamine-formaldehyde foam without abrasive particles (according to WO-A-2009/021963).

75 parts by weight of a spray-dried melamine-formaldehyde precondensate (molar ratio 1:3) were dissolved in 25 parts by weight of water, then 3% by weight of formic acid, 2% by weight of a sodium $C_{12}/C_{14}$-alkyl sulfate, 20% by weight of pentane, all based on the precondensate, were added, this was followed by stirring and then foaming in a polypropylene mold (for foaming) by irradiation with microwave energy. After foaming, the foam was dried for 30 minutes.

The melamine-formaldehyde foam has a density of 10 g/l and a ram pressure value of 21.1 N (all ram pressure measurements to assess the mechanical quality of the melamine formaldehyde foams were carried out as described in U.S. Pat. No. 4,666,948. A cylindrical ram having a diameter of 8 mm and a height of 10 cm was pressed into a cylindrical sample having a diameter of 11 cm and a height of 5 cm in the direction of foaming at an angle of 90° until the sample tore. The tearing force [N], hereinafter also referred to as ram pressure value, provides information as to the mechanical quality of the foamed material).

Example 1

Preparation of a melamine-formaldehyde foam using 10% by weight of quartz sand (based on the total weight of abrasive particles plus melamine-formaldehyde precondensate used for foam production) as abrasive particles.

75 parts by weight of a spray-dried melamine-formaldehyde precondensate (molar ratio 1:3) were dissolved in 25 parts by weight of water, 3% by weight of formic acid, 2% by weight of a sodium $C_{12}/C_{14}$-alkyl sulfate, 20% by weight of pentane, the % by weight each being based on the precondensate, and 8.3 parts by weight of quartz sand (particle size: 0.3 to 0.7 mm, average particle diameter 0.5 mm ($d_{50}$ value, number averaged, determined via optical or electron microscopy combined with image analysis)), were added, which was followed by stirring and then foaming in a polypropylene mold (for foaming) by irradiation with microwave energy. After foaming, the foam was dried for 30 minutes.

The foam has a density of 6.6 g/l and a ram pressure value of 20.8 N.

Examples 2-6

Example 1 was repeated to produce further foams having higher contents of quartz sand. The results are collated below in Table 1.

TABLE 1

| Ex. | Quartz sand content [% by weight]* | Density [g/L] | Ram pressure value [N] |
|---|---|---|---|
| V-A | 0 | 10 | 21.1 |
| 1 | 10 | 6.6 | 20.8 |
| 2 | 20 | 7.2 | 21.0 |
| 3 | 40 | 8.5 | 20.7 |
| 4 | 60 | 11 | 15.4 |
| 5 | 80 | 12.3 | 13.3 |
| 6 | 100 | 12.5 | 11.3 |

*based on the total weight of abrasive particles plus melamine-formaldehyde precondensate used for foam production.

Example 7

Preparation of a melamine-formaldehyde foam using 10% by weight of glass beads (based on the total weight of abrasive particles plus melamine-formaldehyde precondensate used for foam production) as abrasive particles.

75 parts by weight of a spray-dried melamine-formaldehyde precondensate (molar ratio 1:3) were dissolved in 25 parts by weight of water, 3% by weight of formic acid, 2% by weight of a sodium $C_{12}/C_{14}$-alkyl sulfate, 20% by weight of pentane, the % by weight each being based on the precondensate, and 8.3 parts by weight of glass beads of the type Microbeads (0.4 to 0.8 mm, Sigmund Lindner GmbH, average particle diameter 0.6 mm ($d_{50}$ value, number averaged, determined via optical or electron microscopy combined with image analysis)), were added, which was followed by stirring and then foaming in a polypropylene mold (for foaming) by irradiation with microwave energy. After foaming, the foam was dried for 30 minutes.

The foam has a density of 6.8 g/l and a ram pressure value of 21.0 N.

Examples 8-12

Example 7 was repeated to produce further foams having higher contents of glass spheres. The results are collated below in Table 2.

TABLE 2

| Ex. | Glass spheres content [% by weight]* | Density [g/L] | Ram pressure value [N] |
|---|---|---|---|
| V-A | 0 | 10 | 21.1 |
| 7 | 10 | 6.8 | 21.0 |
| 8 | 20 | 7.4 | 21.5 |
| 9 | 40 | 8.6 | 21.1 |
| 10 | 60 | 11.3 | 15.9 |
| 11 | 80 | 12.7 | 12.8 |
| 12 | 100 | 13.1 | 11.1 |

*based on the total weight of abrasive particles plus melamine-formaldehyde precondensate used for foam production.

The examples show that the melamine-formaldehyde foams of the present invention comprising from 0.01% to 45% by weight of a abrasive particles, substantially retain the good mechanical properties of the unfilled foams, whereas in the case of known comparatively highly filled foams the mechanical properties deteriorate abruptly.

Use of Melamine Formaldehyde Foam Comprising Abrasive Particles as Cleaning Implements or to Clean Hard Surfaces.

Cleaning Implement A

A single layer cleaning implement having a cuboid shape defined by three groups of parallel and equal length sides, referred to as a, b and c, with a being 6.5 cm, b being 12 cm, and c being 3 cm is cut from hybrid foam according to present invention. The overall shape of Cleaning Implement A is similar to the cleaning implement of FIG. 1. Cleaning implement A comprises $CaCO_3$ particles as abrasive particles.

Cleaning Implement A is used to clean hard surfaces. Indeed, Cleaning Implement A is wetted with water and thereafter brought into contact with the hard surface to be cleaned. Cleaning Implement A shows an excellent performance in removing greasy soap scum and neat kitchen dirt from said hard surface whilst providing adequate surface safety.

Cleaning Implement B

A dual layer cleaning implement having a cuboid shape defined by three groups of parallel and equal length sides, referred to as a, b and c, with a being 6.5 cm, b being 12 cm, and c being 4 cm is made by foam flame laminating a first layer of hybrid foam according to present invention, having a thickness—side c—of 2 cm to a second layer of commercially available polyurethane foam, having a thickness—side c—of 1 cm. The two layers are joined together at the plane formed by sides a and b. The overall shape of Cleaning Implement B is similar to the cleaning implement of FIG. 2. Cleaning implement B comprises $CaCO_3$ particles as abrasive particles.

Cleaning Implement B is used to clean hard surfaces. Indeed, Cleaning Implement B is wetted with water and thereafter the hybrid foam side of Cleaning Implement B is brought into contact with the hard surface to be cleaned by rubbing said side over the area to be cleaned. The excessive amount of water is thereafter absorbed by the polyurethane layer of Cleaning Implement B by swiping the cleaned surface with said layer. Cleaning Implement B shows an excellent performance in removing greasy soap scum and neat kitchen dirt from said hard surface whilst providing adequate surface safety.

Cleaning Implement C

A dual layer cleaning implement having a cuboid shape defined by three groups of parallel and equal length sides, referred to as a, b and c, with a being 6.5 cm, b being 12.5 cm, and c being 2.5 cm is made by a permanent adhesive a first layer of hybrid foam according to present invention, having a thickness—side c—of 2 cm to a second layer of commercially available polyurethane foam, having a thickness—side c—of 0.5 cm. The two layers are joined together at the plane formed by sides a and b. The overall shape of Cleaning Implement C is similar to the cleaning implement of FIG. 2. Cleaning implement C comprises $CaCO_3$ particles as abrasive particles.

Cleaning Implement B is used to clean hard surfaces. Indeed, Cleaning Implement C is wetted with water and thereafter the hybrid foam according to present invention side of Cleaning Implement C is brought into contact with the hard surface to be cleaned by rubbing said side over the area to be cleaned. The excessive amount of water is thereafter absorbed by the polyurethane layer of Cleaning Implement C by swiping the cleaned surface with said layer. Cleaning Implement C shows an excellent performance in removing greasy soap scum and neat kitchen dirt from said hard surface whilst providing adequate surface safety.

Use of Melamine Formaldehyde Foam Comprising Abrasive Particles According to Present Invention to Clean a Hard Surface A piece of melamine formaldehyde foam comprising abrasive particles according to present invention is used to clean a hard surface by wetting a piece of said foam with water and thereafter bringing it into contact with the hard surface to be cleaned. The hybrid foam according the present invention shows an excellent performance in removing greasy soap scum and neat kitchen dirt from said hard surface, whilst providing surface safety.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore-intended to cover in the appended claims all such changes and modifications that are within the scope of this invention.

What is claimed is:

1. A cleaning implement comprising: a first foam layer comprising a melamine formaldehyde resin foam comprising from about 0.01% to about 45% by weight of abrasive particles having an average particles diameter in the range from about 5 µm to about 3 mm and a second foam layer, wherein the % by weight are based on the total weight of abrasive particles plus melamine-formaldehyde precondensate used for foam production, wherein the first foam layer is permanently attached to the second foam layer, so that the first foam layer and the second foam layer each have a respective exposed face, each said exposed face being suitable for manually cleaning a surface, and the second foam layer is free of abrasive particles.

2. A cleaning implement according to claim 1 comprising from about 1% to about 30% by weight of the abrasive particles, wherein the % by weight are based on the total weight of abrasive particles plus melamine-formaldehyde precondensate used for foam production.

3. A cleaning implement according to claim 2, wherein said abrasive particles have average particle diameters in the range from about 10 µm to about 1000 µm.

4. A cleaning implement according to claim 3, wherein said abrasive particles comprise inorganic substances.

5. A cleaning implement according to claim 4, wherein said abrasive particles comprise quartz, olivine, basalt, glass spheres, ceramic spheres, clay minerals, sulfates, carbonates, kieselguhr, silicates, colloidal silica or mixtures thereof.

6. A cleaning implement according to any one of claim 3, wherein said abrasive particles comprise organic polymers.

7. A cleaning implement according to claim 6, wherein said abrasive particles comprise polyurethane, melamine-formaldehyde resin, epoxy resin, polyester, polycarbonate, polyacrylates, polyamides or mixtures thereof.

8. A cleaning implement according to claim 4, wherein said abrasive particles are embedded into the pore structure of the foam and said average particle diameter is smaller than said average pore diameter of the foam structure.

9. A cleaning implement according to claim 6, wherein said abrasive particles are embedded into the pore structure of the foam and said average particle diameter corresponds to said average pore diameter of the foam structure.

10. A cleaning implement according to claim 1, wherein said melamin-formaldehyde foam comprises at least one additive selected from the group consisting of: biocides; solids; surfactants; colorants; lubricants; cross-linkers; fragrances; plasticizers; odor scavengers; and microcapsules and combinations thereof.

11. A method of cleaning a hard surface, said method comprising a step of using a cleaning implement according to claim 1.

* * * * *